US006910026B2

(12) United States Patent
Luk (10) Patent No.: US 6,910,026 B2
(45) Date of Patent: Jun. 21, 2005

(54) METHOD AND APPARATUS FOR DETERMINING CLASSIFIER FEATURES WITH MINIMAL SUPERVISION

(75) Inventor: Alpha Kamchiu Luk, San Jose, CA (US)

(73) Assignee: Verity, Inc., Sunnyvale, CA (US)

( * ) Notice: Subject to any disclaimer, the term of this patent is extended or adjusted under 35 U.S.C. 154(b) by 706 days.

(21) Appl. No.: 09/940,365

(22) Filed: Aug. 27, 2001

(65) Prior Publication Data

US 2003/0045951 A1 Mar. 6, 2003

(51) Int. Cl.⁷ .............................................. G06F 15/18
(52) U.S. Cl. ....................................................... 706/20
(58) Field of Search ........................................... 706/20

(56) References Cited

U.S. PATENT DOCUMENTS

| | | |
|---|---|---|
| 4,719,571 A | 1/1988 | Rissanen et al. |
| 5,479,523 A | 12/1995 | Gaborski et al. |
| 5,822,742 A | 10/1998 | Alkon et al. |
| 5,940,815 A | 8/1999 | Maeda et al. |
| 6,092,059 A | 7/2000 | Straforini et al. |
| 6,182,058 B1 | 1/2001 | Kohavi |
| 6,266,788 B1 | 7/2001 | Othmer et al. |
| 6,278,464 B1 | 8/2001 | Kohavi et al. |
| 6,336,106 B1 | 1/2002 | Evans |

OTHER PUBLICATIONS

David W. Aha, et al. "Instance–Based Learning Algorithms," Machine Learning, vol. 6, pp 37–66, 1991, © 1991 Kluwer Academic Publishers, Boston.

Primary Examiner—George Davis
(74) Attorney, Agent, or Firm—Cooley Godward LLP (57) ABSTRACT

A method of identifying features for a classifier includes identifying a set of elements that share a common characteristic, and then identifying a subset of elements within that set which share a second characteristic. Features are then selected that are more commonly possessed by the elements in the subset than the elements in the set but excluding the subset, and that are more commonly possessed by the elements in the set but excluding the subset, as compared to the elements outside the set. A further method of identifying features for a classifier includes defining a list of features, selecting a first feature from that list, identifying a set of elements that possess that first feature, and then identifying a subset of elements within that set which possess any other feature. A feature is then selected that is more commonly possessed by the elements in the subset than the elements in the set but excluding the subset, and that is more commonly possessed by the elements in the set but excluding the subset, as compared to the elements outside the set. If this feature is not already in the list of features, it is added to it. Another feature that has not already been selected is chosen from the list, and the process is repeated using this feature. This continues until every feature in the list of features has been selected.

8 Claims, 6 Drawing Sheets

METHOD AND APPARATUS FOR DETERMINING CLASSIFIER FEATURES WITH MINIMAL SUPERVISION

BRIEF DESCRIPTION OF THE INVENTION

This invention relates generally to the field of machine learning. More specifically, this invention relates to reducing the workload required in determining features for a classifier.

BACKGROUND OF THE INVENTION

The field of machine learning seeks to construct computer systems capable of adapting to and learning from their experiences. The field has spawned several different types of learning systems, one of which is the classifier. Classifiers typically are decision-making programs that take an input element and label it as a member of a particular class. For instance, a classifier trained to classify recipes by cuisine type would take an input recipe and label it according to what type of cuisine it represented.

Classifiers typically operate by storing a list of features, or descriptive attributes, which are deemed characteristic of that particular class. The features of an input are then compared to this list of features to determine how many features match and how close the matches are. An input can be deemed to fall into a particular class if a sufficient number of its features match the features of that class closely enough. Thus, in the example above, an input recipe may be classified as a particular type of cuisine if a sufficient number of its ingredients, cooking steps, or other features matches the classifier's features well enough. A classifier's features are often determined by a tedious process that involves manually constructing a training set of pre-labeled inputs. In essence, a number of inputs are selected, their features are manually highlighted, and they are labeled as belonging to a particular class or classes. Classifiers are then "trained" to recognize these features and classify new inputs accordingly.

The accuracy of a classifier depends in part on the number of features it is trained to recognize and the number of inputs in the training set it has to "learn" with. The greater the number of inputs and features in the training set, the better a classifier will be at recognizing features and classifying accordingly. Reliable classifiers thus require a substantial training set with a large number of manually-highlighted features and labels. As the number of inputs and features in a training set is typically large, the manual labeling/highlighting process is often time consuming and costly.

In view of the foregoing, it would be highly desirable to identify features for a classifier in a manner that does not require manual labeling or highlighting of features. Such an improvement could yield a significant savings in time and effort for classifier architects.

SUMMARY OF THE INVENTION

A method of identifying features for a classifier includes identifying a set of elements that share a common characteristic, and then identifying a subset of elements within that set which share another characteristic. Features are then selected that are more commonly possessed by the elements in the subset than the elements in the set but excluding the subset, and that are more commonly possessed by the elements in the set but excluding the subset, as compared to the elements outside the set.

A further method of identifying features for a classifier includes defining a list of features, selecting a first feature from that list, identifying a set of elements that possess that first feature, and then identifying a subset of elements within that set which possess another feature. A feature is then selected that is more commonly possessed by the elements in the subset than the elements in the set but excluding the subset, and that is more commonly possessed by the elements in the set but excluding the subset, as compared to the elements outside the set. If this feature is not already in the list of features, it is added to it. Another feature from the list that has not already been selected is chosen, and the process is repeated using this feature. This continues until every feature in the list of features has been selected.

The method of the invention allows for the determination of classifier features without the need for a training set of manually-highlighted and -labeled inputs, thus saving significant time and effort. All that is required is one input that is known to be a positive evidence of the particular class, and a refinement feature contained in that input. Using just this input and a sufficiently large set of unlabeled training samples, the method can deduce additional features characteristic of that particular class. These additional features can then be used to build a classifier.

BRIEF DESCRIPTION OF THE DRAWINGS

For a further understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
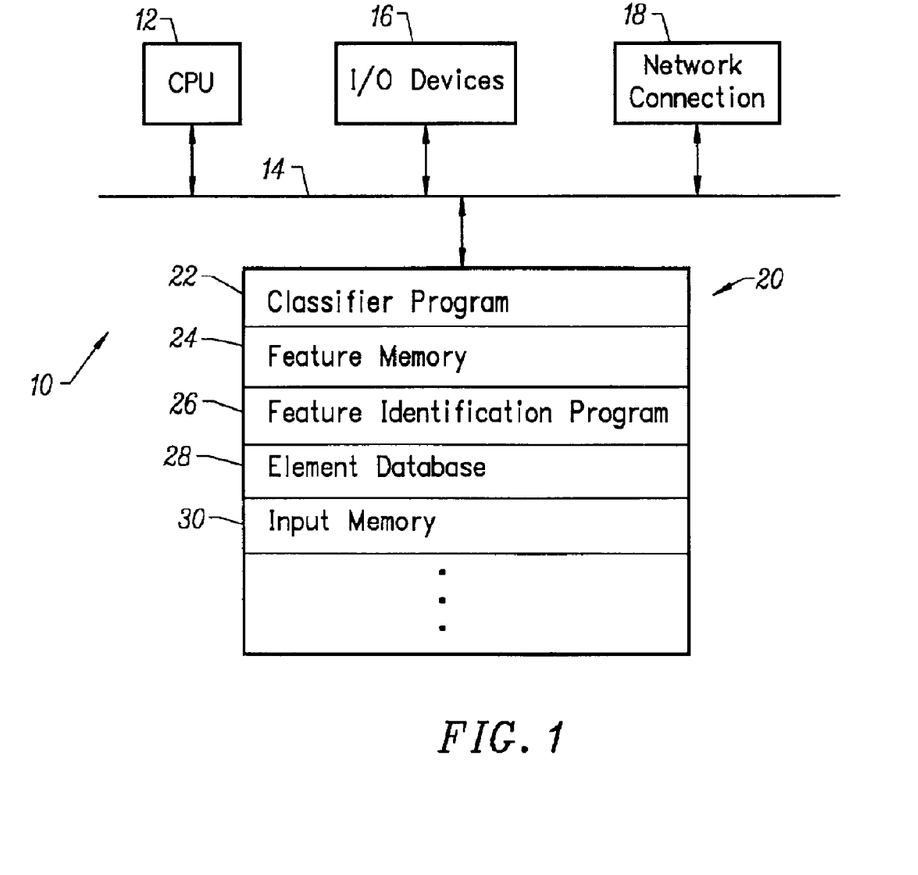
FIG. 1 illustrates a computer constructed in accordance with an embodiment of the invention.

FIG. 1 illustrates a computer 10 that may be operated in accordance with an embodiment of the present invention. The computer 10 is a standard computer including a Central Processing Unit (CPU) 12 connected by a bus 14 to various input/output (I/O) devices 16, network connection 18, and memory 20. The I/O devices 16 enable users to both input data to the computer and receive data from it. Network connection 18 allows the computer 10 to communicate with other computers on the same network. Memory 20 stores a number of computer programs and other computer-readable data, including a classifier program 22, feature memory 24, feature identification program 26, element database 28, and input memory 30. The classifier program 22 can act to classify various inputs according to features stored in feature memory 24.

In typical use and in accordance with the invention, features are identified by feature identification program 26 using elements stored in element database 28. Once features are identified and a classifier program 22 is built, classifier program 22 can receive input from input memory 30, from I/O device 16, or from network connection 18. Classifier program 22 can then classify that input according to the features stored in feature memory 24. In another mode of use but still in accordance with the invention, feature identification program 26 can also utilize elements input from I/O device 16 or from network connection 18, rather than database 28.

Figure 2A:
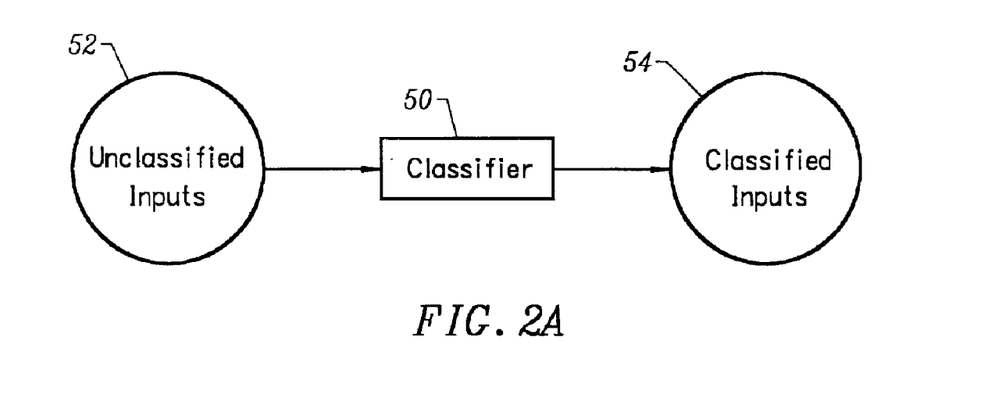
FIG. 2A illustrates the operation of a document classifier.
Figure 2B:
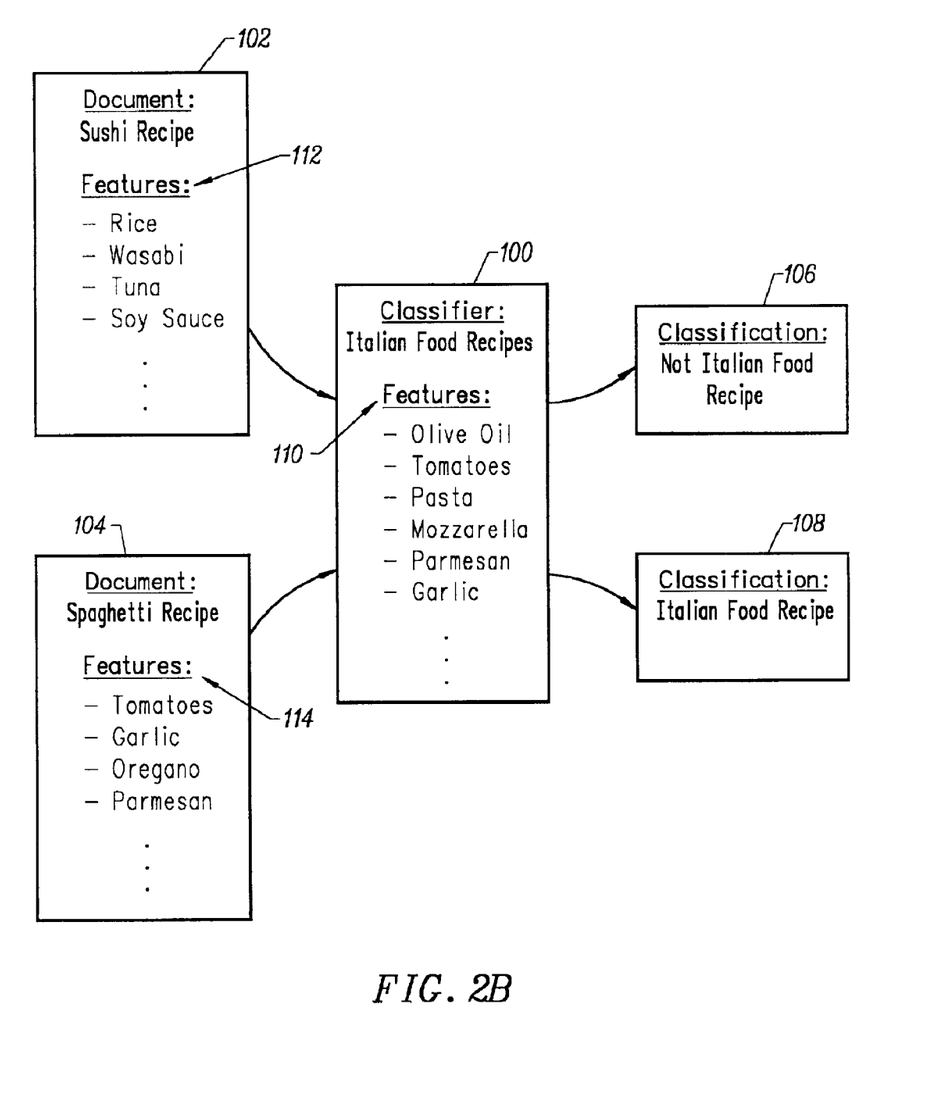
FIG. 2B illustrates the operation of a recipe classifier.

FIG. 2A illustrates the basic operation of a typical classifier. Classifier 50, which can be a representation of classifier program 22, receives unclassified inputs 52 and labels them according to predetermined classes, thus producing classified inputs 54. FIG. 2B provides a more specific example of the operation illustrated in FIG. 2A. Classifier 100 is configured to receive documents 102 and 104, which in this case are text documents representing recipes, and classify them into one of two categories: 1) Italian food recipe, or 2) not Italian food recipe. The result is classified documents 106 and 108. A classifier like classifier 100 configured to classify inputs into two categories is often called a binary classifier. Although this example features a binary classifier, the invention should not be construed as limited to identifying features for binary classifiers. Rather, the invention relates to identifying features for use in any feature-based classifier.

Classifier 100 utilizes a feature list 110 containing text features such as the words or phrases "olive oil," "pasta," "parmesan" and the like. In accordance with the invention, these features may have already been identified by a program such as feature identification program 26, and stored in feature memory 24. They have been selected as descriptive attributes of Italian food recipes. Likewise, the text of sushi recipe 102 contains within it textual features 112 such as "rice," "wasabi" and "soy sauce." Classifier 100 examines textual features 112 and compares them to feature list 110 for similarities. As can be seen in this case, few or no similarities exist between the two, leading classifier 100 to classify the document as "not Italian food recipe" and output classified document 106, which consists of sushi recipe 102 with the associated classification of "not Italian food recipe." In similar fashion, the text of spaghetti recipe 104 contains textual features 114 such as "tomatoes," "garlic," and "oregano." Classifier 100 compares these features 114 to its list of features 110. As many textual similarities exist, classifier 100 would classify spaghetti recipe 104 as "Italian food recipe" and output classified document 108 consisting of recipe 104 with the associated classification of "Italian food recipe."

Note that even though the above example concerns features, such as ingredients, which consist of written words, features need not be so limited. The use of audible, visual, or other types of features in classifiers is well known. This invention thus should be construed as relating to the determination of any type of feature that can be used to classify an input.

Figure 3:
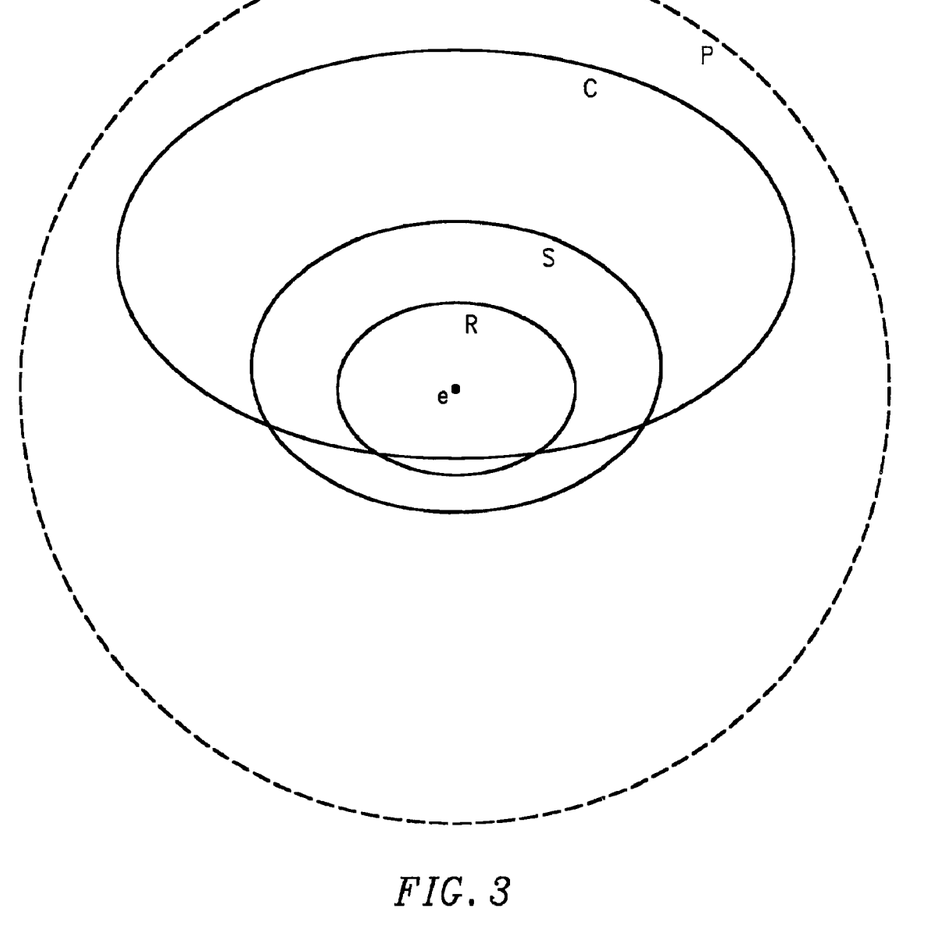
FIG. 3 is a graphical illustration of conceptual groups utilized in accordance with an embodiment of the invention.

FIG. 3 graphically illustrates conceptual groups utilized in accordance with an embodiment of the invention. Typically, an embodiment of the invention would be stored as an executable program such as feature identification program 28, which can act to determine features according to the invention. In concept, a population P made up of elements e typically exists, some of which also belong to class C and some of which do not. A properly trained classifier such as classifier program 22 seeks to input elements e from population P and correctly discern whether they also belong to class C. One aspect of the invention entails determining a set S within P such that a randomly chosen element of S likely also belongs to C. A subset R within S is also chosen such that a randomly chosen element of R is even more likely to belong to C. Note that P, S, and R are sets of elements e, where each element e has a number of features or descriptive attributes. For example, if e is a document, then each word or phrase that may be used to characterize the document can be considered a feature. Elements e of R are scrutinized to determine features that are much more likely to exist within R than within the rest of S, and that are much more likely to exist within the rest of S than in the rest of P. Graphically, it can be seen that features of this type are evidence of class C. These features can then be used to build a classifier trained to recognize inputs as belonging to C or not.

According to the above aspect of the invention, no labeled training data are required. Classifier designers need only designate set S and subset R. Set S can be determined by identifying those elements of P that possess one attribute s. In keeping with the above concept, attribute s should be chosen such that the probability of an element/input with that attribute being in C is statistically much greater than the probability of any random element in P to be in C. Mathematically, this condition can be expressed as:

$$P(C|s) \gg P(C) \tag{1}$$

Here, $P(C|s)$ designates the probability of an element with feature s to be a member of class C, and $P(C)$ designates the probability of a random element to be a member of class C.

Once an attribute is chosen and S is determined, a refinement feature r is chosen. The subset of S consisting of those elements that also contain refinement feature r is designated as R. Refinement feature r should be chosen such that the probability of an element/input with both r and s being in C is statistically much greater than the probability of an element in S to be in C. Mathematically, this condition can be expressed as:

$$P(C|s, r) \gg P(C|s) \tag{2}$$

Figure 4:
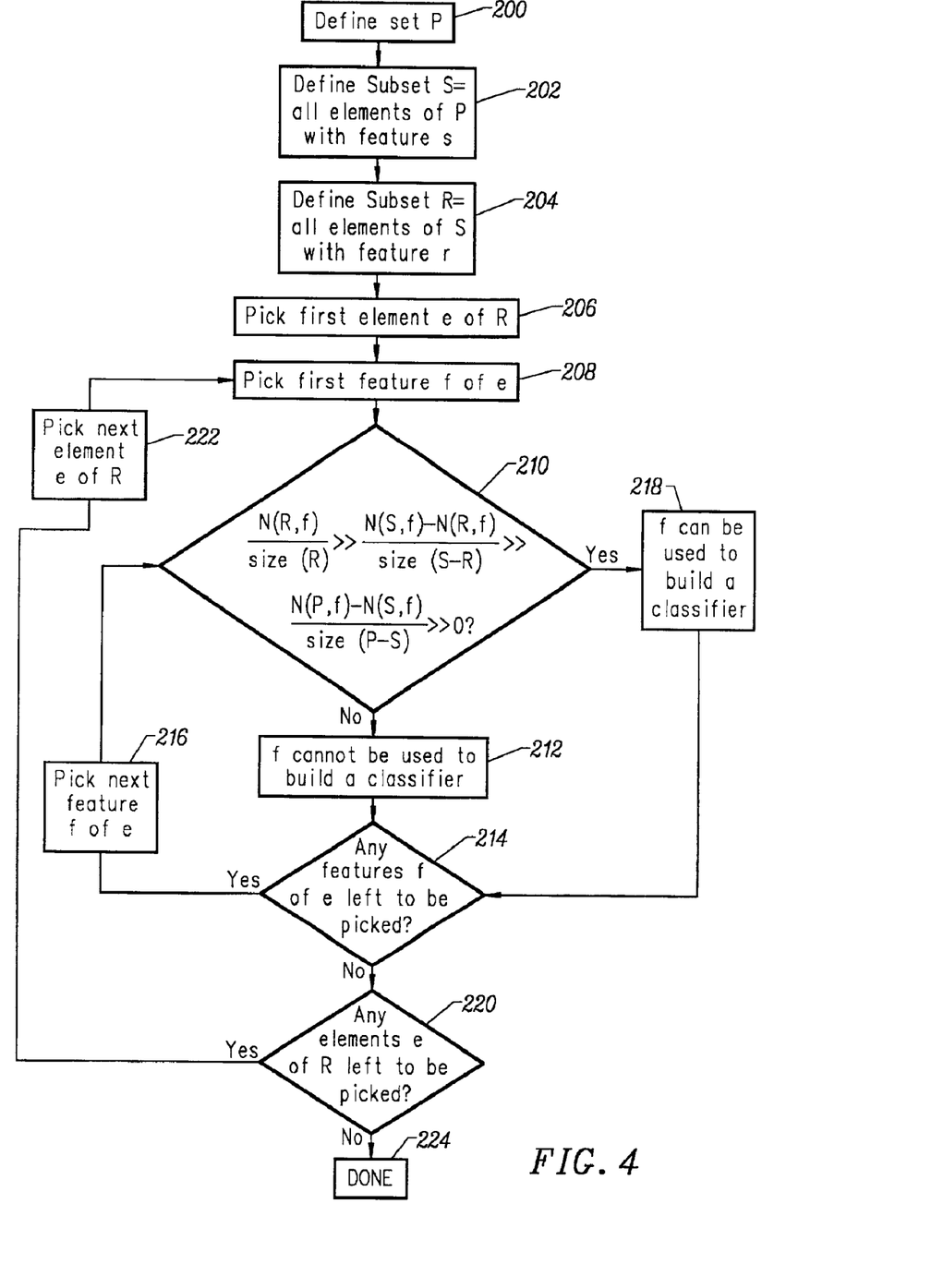
FIG. 4 illustrates processing operations that identify features according to a method of the invention.

Once S is chosen such that (1) is met, and R is chosen such that (2) is met, elements e of R can be examined to find features that are much more likely to be found in R than in (S−R), and much more likely to be found in (S−R) than in (P−S). Mathematically, this condition can be expressed as:

$$\frac{N(R, f)}{\text{size}(R)} \gg \frac{N(S, f) - N(R, f)}{\text{size}(S - R)} \gg \frac{N(P, f) - N(S, f)}{\text{size}(P - S)} \tag{3}$$

where
N(A,b)=number of elements in set A with feature b
size(A)=number of elements in set A The presence of features that satisfy (3) is deemed indicative of class C. These features can then be used to build a classifier for class C. The determination of features that satisfy (3) can be accomplished in a number of ways, all of which fall within the concept of the present invention. FIG. 4 illustrates the processing steps of a first embodiment in accordance with the conceptual grouping of FIG. 3. The first processing step is to define set P (step 200). Set P can be a set of any inputs, such as documents, physical objects, or anything else capable of being recognized by a classifier. Elements of P are typically stored in element database 28.

The next processing step is to define subset S, defined as all elements of P with feature s (step 202). Feature s should be chosen such that condition (1) is satisfied. In the example above, one feature s could be the term "fettuccine." It is likely that documents containing this term are much more likely to be Italian food recipes than a random document from set P, meaning that condition (1) is probably satisfied.

Once s is chosen, the next processing step is to define a subset R of S, consisting of all elements of S which also possess a refinement feature r (step 204). Feature r should be chosen such that condition (2) is satisfied. Again referring to the above example, one candidate for feature r could be the term "alfredo." Documents containing both "fettuccine" and "alfredo" are probably much more likely to be Italian recipes—indeed, a recipe for fettuccine alfredo—than documents containing just "fettuccine," which could be product lists from grocery stores or pasta companies, or something else.

Features s and r can be selected in a number of ways so long as conditions (1) and (2) are satisfied, and the invention should be construed to cover any of these ways. A number of such ways are currently known. For instance, s and r can be determined by classifier designers, or others, based on observation and experience. As a typical example, based on observation and experience in the collection of documents to be classified, a designer may decide that a document containing the word "fettuccine" should have a higher probability of containing an Italian recipe than any random document. Likewise, the designer may decide that a document containing the term "alfredo" in addition to the word "fettuccine" should have an even higher probability than a document containing only the word "fettuccine."

Regardless of the designer's observation or experience, features s and r can also be chosen on the basis of their membership in particular sets/subsets of P that are known/believed to have a higher concentration of members in the target class C. For example, the designer may decide that a recipe in an Italian cookbook has a higher probability of relating to Italian cooking than a random document. The designer can then use the membership of set S that contains all recipes in the Italian cookbook as the seed positive evidence s.

In addition, while up to this point S and R have been determined by first designating s and r respectively, S and R can also be found directly, without the need for identifying s and r. For instance, while one aspect of the invention seeks to avoid the necessity for tagging documents, designers may also choose to acquire S and R through tagging. Typically, designers may choose to tag a number of documents and designate them as set S. They may then determine subset R as those documents that belong to the target class C. The processes of the invention can then continue without the need for selecting s and r.

Sets S and R can also be acquired directly by using one or more crude classifiers for C. For instance, a crude classifier can be used to classify a set of documents S. If the crude classifier is known/believed to have an accuracy greater than the baseline (i.e., the accuracy associated with randomly selecting documents in the set and assigning a random classification), the set of documents classified as belonging to C will have a higher concentration of members of C than will the rest of S. This means the set of documents classified as belonging to class C can be used as set R, and the processes of the invention can continue without the need for selecting s and r. The invention should be construed to include methods involving the direct determination of S and R, as well as the determination of S and R via first identifying s and r.

The next processing step is to select a first element e from R (step 206). If R is a set of documents, then e would be an individual document within R. Once step 206 is performed, a feature f of e is selected (step 208). This feature f is examined to determine whether it meets condition (3) or not (step 210). If condition (3) is not satisfied, a determination is made that f cannot be used as a feature for building a classifier (step 212).

The next processing step is to determine whether any features of e remains to be selected (step 214). If so, the next feature f of e is selected (step 216), and the process is repeated from step 210. Step 214 is known in the art and, for documents, can consist of performing a text search to determine whether any previously-unselected text strings exist. If, however, condition (3) is satisfied, then it is determined that f can be used to build a classifier (step 218). The process then repeats from step 214 to find other features f that can also be used to build a classifier.

The next processing step occurs once a determination is made at step 214 that no features f of e remain to be selected. An inquiry is then made whether any elements e of R remain to be selected (step 220). If so, the next element e is selected (step 222), and the process repeats from step 208. Once all elements e of R have been selected, the process terminates (step 224).

Figure 5A:
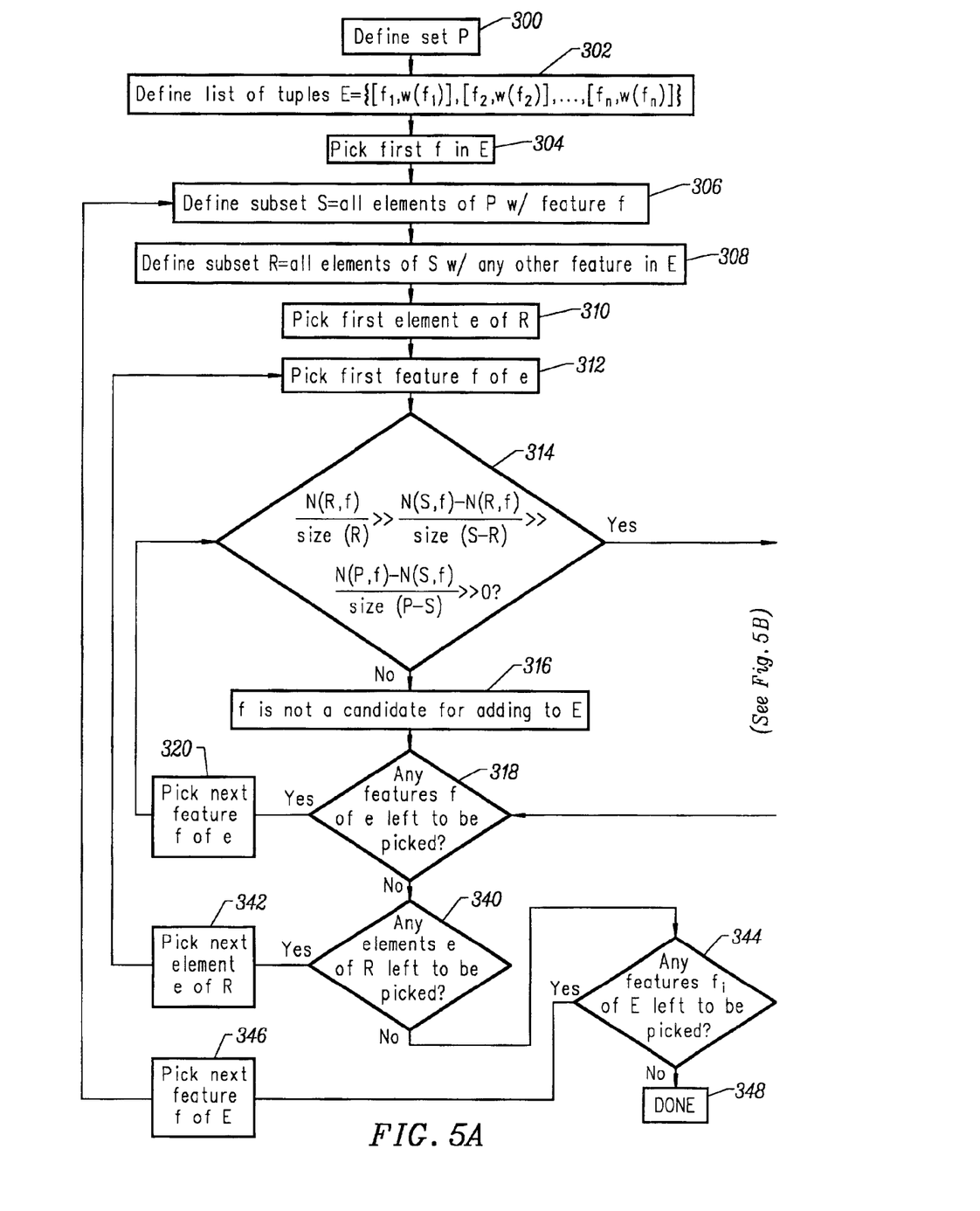
FIG. 5 illustrates processing operations that identify features according to another method of the invention.
Figure 5B:
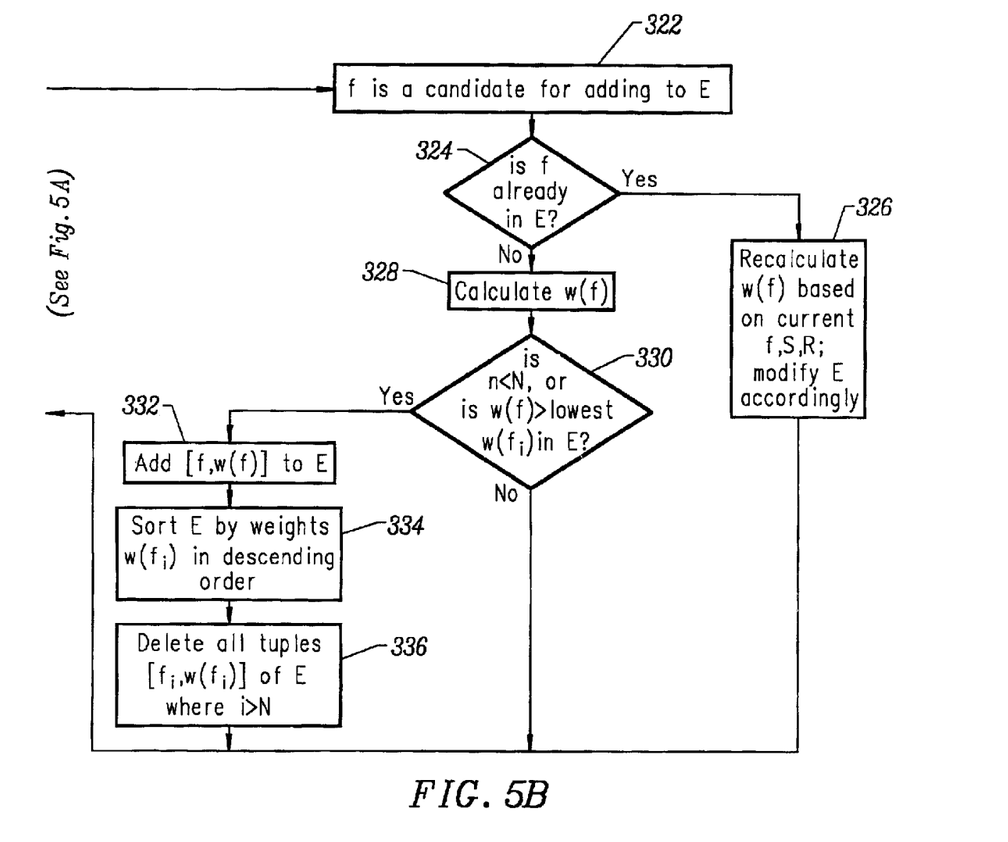

FIG. 5 illustrates the processing steps of a second embodiment in accordance with the conceptual grouping of FIG. 3. In this embodiment, the conceptual groupings of FIG. 3 are used in an iterative manner to identify more features than would otherwise likely be obtained. This embodiment includes determining a list of features and their associated weights (a measure of how well the feature would function as an indicator of a class), determining S based on one feature in the list, and then determining R based on other features in the list. Other features are identified using the concept of FIG. 3, these features are added to the list depending on their weights, and the process is repeated with other features. This embodiment thus exemplifies the concept of determining a set of features and associated weights, using these features to determine new features, and updating this set with the new features if they are better than the current features.

The first processing step is to select a set P (step 300). This step is performed in similar fashion to step 200 above. The next processing step is to define a list of tuples E, where each tuple consists of a feature f and its associated weight w(f) (step 302). Weight w(f) is a measure of how strong the feature f is evidence of membership in a class. The calculation of weight w(f) is known in the art and is currently accomplished by a variety of methods. The present invention should not be construed as limited to any single method, though; instead, it should be construed to include the calculation of w(f) by any means known in the art.

The next processing step is to pick the first feature f in E (step 304). Once this step is performed, a subset S is defined as all elements of P containing the feature f picked in step 304 (step 306). The next processing step is to define subset R as all elements of S with any other feature in E (step 308). Once R is defined, a first element e of R is selected (step 310), as is a first feature f of e (step 312). This feature f is examined to determine whether it meets condition (3) (step 314).

If feature f does not satisfy (3), it is deemed an inadequate candidate for adding to E (step 316). If features f of e remain to be selected (step 318), the next feature f of e is selected (320) and the process repeats from step 314.

If, however, f meets condition (3), f is deemed a candidate for potentially adding to E (step 322). An inquiry is then made whether f is already in E (step 324). If it is, its weight w(f) is recalculated to update it, E is modified accordingly (step 326), and the process continues from step 318. If f is not already in E though, then it has no weight as of yet. A weight w(f) is thus calculated (step 328). If set E already has a sufficient number of features, or if this w(f) is not any greater than the lowest weight w in E (step 330-No), the process then continues from step 318. Otherwise, (step 330-Yes) feature f and its weight w(f) are added to E (step 332). Set E is sorted by the weight w(f) of each tuple (step 334), and if the number of tuples exceeds the maximum number of tuples allowed in E by a certain number, then that number of the lowest-weight tuples are deleted from E (step 336). The process then continues from step 318.

It can be seen that the above steps act to identify features, determine whether they are better than the current features of E in terms of building an effective classifier, and update E accordingly. In this manner, set E is iteratively improved by only keeping the best features f. It should be noted that the above process discusses a set E with a maximum number of tuples. While it is often true that E is limited by constraints such as the amount of available memory or processing power, the invention should not be construed as limited to sets E with a designated maximum number of tuples. In fact, as memory and processing power increase with continued innovation in computer design and technology, the upper bounds of set E can increase. Thus, the invention should be construed as covering a method and apparatus for iteratively determining features and associated weights for an arbitrarily large set E. It can thus be seen that the size limitation on E that is found in steps 330 through 336 exists only to satisfy current hardware constraints, and may be removed without detracting from the spirit of the invention.

Likewise, the termination condition of the process of FIG. 5 need not even be based on the size of E. The invention simply includes a process for iteratively determining new features based on a set E; as such, the exact termination condition of the process can vary. For instance, without diverging from the concept of the invention, the termination condition can be based on an estimated accuracy using pre-labeled inputs. After E is updated, say after step 326 or step 336, the resulting classifier can be tested against a set of pre-labeled test inputs containing both members and non-members of class C. The accuracy of the classifier can be estimated based on the results of this test, and the procedure can be terminated if the classifier achieves a specified accuracy or fails to improve in subsequent tests. Yet another termination condition may include modifying E. After each time E is updated, users may be allowed to add new tuples to E, or replace tuples, at his or her discretion. This would, for instance, allow users to modify E and restart the process after a termination condition is met and the process halts.

Once no features f of e remain to be selected at step 318, the next processing step is to determine whether any elements e of R remain to be picked (step 340). If any elements e of R remain to be picked, they are selected (step 342) and the process repeats from step 312. If no elements e of R remain to be picked, the next processing step is to determine whether any features f of E remain to be selected (step 344). If so, the next feature f of E is selected (step 346), and the process repeats from step 306. If not, the process terminates (step 348).

Note that other embodiments of the invention also exist. For instance, the embodiment of FIG. 5 can be modified so that step 308 is not limited to simply defining R as all elements of S with any other feature in E. Without diverging from the spirit of the invention, R can for instance be defined as all elements of S with any group of features in E, any other single feature in E, or all other features in E. This would not violate the concept of the invention, which simply discloses selecting a subset R of S based on the features in E. It should also be appreciated that a combination of features can be processed as a single feature.

The foregoing descriptions of specific embodiments of the present invention are presented for purposes of illustration and description. They are not intended to be exhaustive, or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

I claim:

1. A method, implemented as executable instructions performed by a computer, of identifying features for a classifier, said method including:
    identifying a set of elements that share a common characteristic, each element of said set of elements including one or more features;
    identifying those elements in said set of elements that possess a second characteristic, so as to form a subset of said set; and
    selecting a feature that is more commonly possessed by the elements in said subset than the elements in said set excluding said subset, and that is more commonly possessed by the elements in said set excluding said subset, compared to elements outside said set.

2. A computer-readable memory including executable instructions to instruct a computer to identify features for a classifier, including:
    instructions to identify a set of elements that share a common characteristic, each element of said set of elements including one or more features;
    instructions to identify those elements in said set of elements that possess a second characteristic, so as to form a subset of said set; and
    instructions to select a feature that is more commonly possessed by the elements in said subset than the elements in said set excluding said subset, and that is more commonly possessed by the elements in said set excluding said subset, compared to elements outside said set.

3. A method, implemented as executable instructions performed by a computer, of identifying features that can be used for a classifier, said method comprising:
    defining a first set of elements that share a first feature;
    identifying a second set of elements within said first set of elements that share a second feature;
    selecting a designated element from said second set of elements;
    picking a designated feature associated with said designated element; and
    selecting said designated feature for a classifier when said designated feature is more commonly possessed in said second set of elements than in a first space that includes said first set of elements but excludes said second set of elements, and is more commonly possessed in said first space than in a second space outside said first space.

4. A computer-readable memory including executable instructions to instruct a computer to identify features for a classifier, including:
    instructions to define a first set of elements that share a first feature;

instructions to identify a second set of elements within said first set of elements that share a second feature;

instructions to select a designated element from said second set of elements;

instructions to pick a designated feature associated with said designated element; and instructions to select said designated, feature for a classifier when said designated feature is more commonly possessed in said second set of elements than in a first space that includes said first set of elements but excludes said second set of elements, and is more commonly possessed in said first space than in a second space outside said first space.

5. A method, implemented as executable instructions performed by a computer, of identifying features for a classifier, said method including the steps of:

(A) defining a list of features;

(B) selecting a first feature from said list of features;

(C) identifying a set of elements that possess said first feature;

(D) identifying those elements in said set of elements that possess any other feature in said list of features, so as to form a subset of said set;

(E) selecting a feature that is more commonly possessed by the elements in said subset than the elements in said set excluding said subset, and that is more commonly possessed by the elements in said set excluding said subset, compared to elements outside said set, so as to designate a candidate feature;

(F) adding said candidate feature to said list of features if said candidate feature is not already in said list of features;

(G) selecting from said list of features a feature that has not already been selected, so as to designate a next feature;

(H) identifying a set of elements that possess said next feature; and (I) repeating (D), (E), (F), (G), and (H) in order until every feature in said list of features has been selected.

6. The method of claim 5 wherein said list of features includes associated weighting values, and wherein (F) includes determining a weighting value for said candidate feature, sorting the features in said list of features in order of their associated weighting values, and removing certain features from said list of features based on said weighting values.

7. A computer-readable memory including executable instructions to instruct a computer to identify features for a classifier, including instructions to:

(A) define a list of features;

(B) select a first feature from said list of features;

(C) identify a set of elements that possess said first feature;

(D) identify those elements in said set of elements that possess any other feature in said list of features, so as to form a subset of said set;

(E) select a feature that is more commonly possessed by the elements in said subset than the elements in said set excluding said subset, and that is more commonly possessed by the elements in said set excluding said subset, compared to elements outside said set, so as to designate a candidate feature;

(F) add said candidate feature to said list of features if said candidate feature is not already in said list of features;

(G) select from said list of features a feature that has not already been selected, so as to designate a next feature;

(H) identify a set of elements that possess said next feature; and (I) repeat (D), (E), (F), (G), and (H) in order until every feature in said list of features has been selected.

8. The computer-readable memory of claim 7 wherein said list of features includes associated weighting values, and wherein (F) includes instructions to determine a weighting value for said candidate feature, sort the features in said list of features in order of their associated weighting values, and remove certain features from said list of features based on said weighting values.

* * * * *